United States Patent [19]

Cromas et al.

[11] 4,422,420

[45] Dec. 27, 1983

[54] METHOD AND APPARATUS FOR FUEL CONTROL IN FUEL INJECTED INTERNAL COMBUSTION ENGINES

[75] Inventors: Joseph C. Cromas, Northville; Charles M. McQuillan, Milford, both of Mich.

[73] Assignee: TRW Inc., Cleveland, Ohio

[21] Appl. No.: 305,110

[22] Filed: Sep. 24, 1981

[51] Int. Cl.³ .................. F02D 33/00; F02M 37/04
[52] U.S. Cl. ............................. 123/352; 123/375; 123/390; 123/458; 180/179
[58] Field of Search ............... 123/357, 358, 375, 390, 123/456, 458, 480, 486, 487, 472, 478, 350, 511, 512, 513, 352; 180/176, 179

[56] References Cited

U.S. PATENT DOCUMENTS

| | | | |
|---|---|---|---|
| 3,128,750 | 4/1964 | Schmidt | 123/390 X |
| 3,827,409 | 8/1974 | O'Neill | 123/458 |
| 3,844,263 | 10/1974 | Endo et al. | 123/458 |
| 3,861,366 | 1/1975 | Masaki et al. | 123/440 |
| 4,046,118 | 9/1977 | Aono | 123/440 |
| 4,057,042 | 11/1977 | Aono | 123/440 |
| 4,103,695 | 8/1978 | Aono | 123/440 |
| 4,181,103 | 1/1980 | Sturdy | 123/352 |
| 4,183,334 | 1/1980 | Van Dine | 123/510 |
| 4,191,215 | 3/1980 | Gonner | 137/870 |
| 4,203,395 | 5/1980 | Cromas et al. | 123/339 |
| 4,207,849 | 6/1980 | Sumiyoshi et al. | 123/458 |
| 4,245,598 | 1/1981 | Ruhl | 123/333 |
| 4,248,194 | 2/1981 | Drutchas et al. | 123/497 X |
| 4,260,333 | 4/1981 | Schillinger | 123/458 X |
| 4,359,984 | 11/1982 | Nakao | 123/357 |

FOREIGN PATENT DOCUMENTS 55-60631  5/1980  Japan ................................ 123/458

OTHER PUBLICATIONS

"Vehicle Speed Limiting" by Hewitt (Product Brochure).

Primary Examiner—Tony M. Argenbright
Attorney, Agent, or Firm—Yount & Tarolli

[57] ABSTRACT

Method and apparatus are disclosed for controlling fuel flow from a fuel source to the fuel rail of a fuel injected, internal combustion engine. Two fuel flow paths are connected in parallel between the source and the fuel rail, an on-off solenoid valve being provided in each of the fuel flow paths. The two solenoid valves have dissimilar fuel flow capacities. A microcomputer generates a pulse width modulated signal for application to a selected one of the two solenoid valves so as to control fuel flow through the associated fuel flow path. The microcomputer decides to which solenoid valve to apply the pulse width modulated signal and the duty cycle of the pulse width modulated signal in accordance with the value of a master variable. The master variable is adjusted in accordance with the difference between vehicle or engine speed and an associated limit, thereby providing vehicle or engine speed governing. The system is also operable in cruise control and variable engine speed governing modes.

26 Claims, 10 Drawing Figures

PWM SIGNAL

METHOD AND APPARATUS FOR FUEL CONTROL IN FUEL INJECTED INTERNAL COMBUSTION ENGINES

BACKGROUND AND FIELD OF THE INVENTION

The present invention relates to the art of fuel flow control devices, and more particularly to a fuel flow control system for controlling fuel flow from a fuel source to the fuel rail of a fuel injected internal combustion engine.

In the trucking industry, a substantial portion of the overhead is attributable to the cost of the fuel consumed by the trucks. Anything which can reduce fuel costs and thereby lower the operating overhead of the business would be welcomed. Because of this, engine control systems have been devised which prevent excessive fuel consumption by limiting the maximum speed of the trucks.

One known manner of limiting the maximum speed of trucks is by blocking fuel flow to the engine of the truck whenever the vehicle speed exceeds acceptable limits. The patent to Ruhl, U.S. Pat. No. 4,245,598 discloses a system typifying this approach. In this patent the fuel limitation is accomplished by means of a solenoid valve connected between the fuel rail of the diesel engine and the fuel tank. When open, the valve permits fuel flow to bypass the engine, thereby reducing fuel flow to the engine. The valve is normally closed and only opens when the truck speed exceeds acceptable limits. Another prior system, manufactured and sold by Hewitt Industries of Los Angeles, Calif., accomplished the fuel limitation through use of a solenoid valve actually connected in series between the fuel pump and the fuel rail of the engine. Here, the valve was normally open and was only closed when the speed exceeded the desired limit.

The patents to Van Dine, U.S. Pat. No. 4,183,334 and Sumiyoshi, U.S. Pat. No. 4,207,849 disclose systems wherein fuel flow to a carburated internal combustion engine is modulated incrementally by actuating selected ones of plural on-off solenoid valves which are connected in parallel fuel flow paths. In these systems the smallest increment by which fuel flow can be varied is dependent upon the number of valves used. A large number of parallel valves is required if fine fuel flow control over a broad range of flow rates were desired.

The patent to Cromas et al., U.S. Pat. No. 4,203,395 discloses a closed loop idle speed control for a fuel injected engine wherein pulse width modulated valves are used to control the amount of air which bypasses the throttle valve in the engine so as to maintain a smooth idle speed. The pulse width modulated solenoid valve is used to supply operating fluid to a single-acting mechanical actuator controlling the bypass of air. In the patents to Aono, U.S. Pat. Nos. 4,046,118, 4,057,042, and 4,103,695 a pulse width modulated valve is used to directly control the supply of fuel to the fuel wells of a carburated internal combustion engine. By pulse width modulating the valve, proportional fluid flow control is provided through use of only a single valve. Unfortunately, fluid flow control at the lower end of the fluid flow control range is rather coarse since the duty cycle of the pulse width modulated signal is then quite small.

SUMMARY OF THE INVENTION

The present invention provides a fuel flow control device which is well suited for use in providing full range speed control for a fuel injected diesel engine. The fuel flow control device includes plural on-off solenoid valves connected in respective ones of plural fuel flow paths arranged in parallel between a fuel source and the fuel rail of a fuel injected internal combustion engine. Fuel flow is controlled by controlling the amount of fuel flow restriction provided by the plural valves. The valves are controlled with a pulse width modulated signal provided by a control system. The control system generates a control signal (referred to herein as the "master variable") in accordance with which fuel flow is to be controlled. The control system determines from this control signal which of the valves to operate and the duty cycle of the pulse width modulated signal to be applied to that valve. In the preferred embodiment, two valves having dissimilar flow capacities are used. The smaller valve is modulated for fine control of residual fuel flow when the large valve is closed (i.e., during periods of high restriction of fuel flow). The larger valve is modulated to provide control of fuel flow restriction and thus fuel flow when less restriction of fuel flow is required.

Although few valves are used, fuel flow control is available over a broad range of flow rates due to the use of pulse width modulation. Moreover, fine fluid control is provided at the lower end of the fluid flow control range since then the large valve is closed and flow is controlled by a different valve having a smaller capacity.

In the embodiment disclosed, the fuel flow control system is used to control fuel flow to the fuel injectors of a fuel injected diesel engine. The control signal is adjusted in accordance with the difference between vehicle or engine speed and predetermined limits in order to prevent the engine or vehicle speed from exceeding the limits. The system is also operable to provide cruise control and variable engine speed control.

BRIEF DESCRIPTION OF THE DRAWINGS

The foregoing and other objects and advantages of the present invention will become more readily apparent from the following detailed description, as taken in conjunction with the accompanying drawings, wherein.

DETAILED DESCRIPTION

In the detailed description which follows, the engine to which fuel flow is being provided will be referred to as a diesel engine. It will be appreciated, however, that the method and apparatus of the present invention are equally applicable to other types of fuel injected engines, including spark ignition engines.

Figure 1:
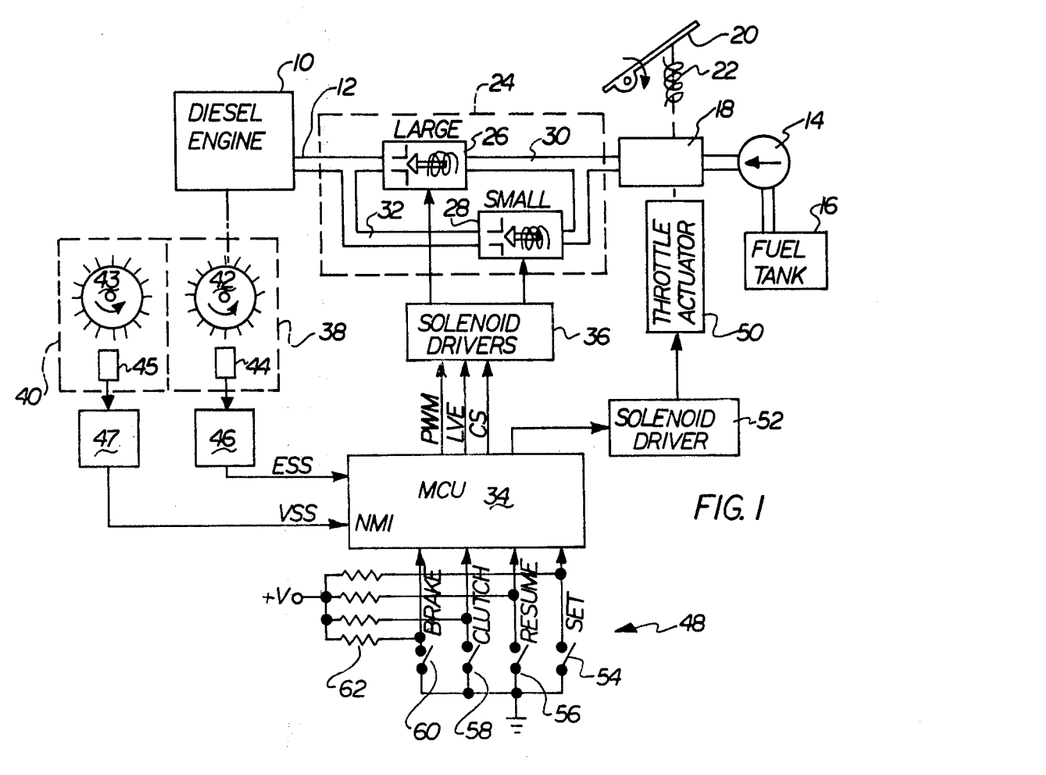
FIG. 1 is a block diagram of a diesel engine control system employing the concepts of the present invention.

In FIG. 1 a conventional fuel injected diesel engine 10 is shown as supplied with fuel from a fuel rail 12. The amount of fuel injected into the cylinders of the diesel engine 10 is dependent upon the pressure in the fuel rail 12; the greater the pressure, the greater the amount of fuel which is injected. A fuel pump 14 pumps fuel to the fuel rail 12 from a fuel tank 16. A throttle valve 18 is included in series between the fuel pump 14 and the fuel rail 12 so as to modulate the fuel pressure in the fuel rail (i.e., the rail pressure) and thereby control the operation of the diesel engine. The throttle valve 18 is essentially a variable orifice whose cross-sectional area is controlled by a foot pedal 20 located in the cab of the vehicle with which the diesel engine 10 is associated. As the operator depresses the pedal 20, the throttle valve 18 opens, providing less restriction of the fuel flow from the fuel pump 14 to the fuel rail 12. This causes an increase in the rail pressure and a commensurate increase in the amount of fuel injected into the diesel engine 10. As the operator backs off the pedal 20, however, a return spring 22 forces the pedal in the opposite direction, thereby effectively reducing the cross-sectional area of the throttle valve 18 and reducing the rail pressure accordingly.

In accordance with the present invention, an additional valve assembly 24 is connected in-line between the fuel source (fuel tank 16 and pump 14) and the fuel rail 12 of the engine 10. The valve assembly 24 is therefore connected in series with throttle valve 18. The valve assembly 24 is often referred to herein as a fuel flow control device since its function is to control fuel flow. More accurately, however, the valve assembly controls fuel flow restriction (i.e., the effective cross-sectional area of orifices within valve assembly 24) rather than the volume of fuel flow, per se. The actual rate of fuel flow is dependent not only on the extent of fuel flow restriction but also upon the pressure drop across the valve assembly.

The volume of fuel flow may be directly controlled by the valve assembly 24 either by regulating the pressure drop across the assembly 24 or by using feedback (i.e., sensing volumetric flow and controlling the valve assembly in accordance with the volumetric flow thus sensed). Feedback is used in the embodiment described herein, however instead of volumetric fuel flow the sensed variable is the speed of an engine controlled part (either part of the vehicle drive train or part of the engine, per se). The speed of the engine controlled part is functionally dependent upon the rate of fuel flow, but is also dependent upon many other factors as well (i.e., engine loading, engine temperature, etc.).

Valve assembly 24 includes two valves 26 and 28 connected in parallel fuel flow paths 30 and 32, respectively, between throttle valve 18 and the fuel rail 12.

The term "parallel" is used herein in a functional, rather than a geometrical, sense. In other words, the fuel flow paths 30 and 32 are referred to as connected in parallel because they are connected between common points. Valves 26 and 28 provide additional fuel flow restriction which is automatically controlled to limit maximum engine or vehicle speed. When both of these valves are open, they provide essentially no restriction of the fuel flow between the throttle valve 18 and the fuel rail 12. Fuel flow can be controllably restricted, however, by controlling the functioning of the two valves 26 and 28.

Each of the valves 26 and 28 is preferably a single acting, spring return poppet valve controlled by a respective solenoid. The solenoids each include an armature having a valve attached thereto for seating against an associated orifice. The return springs bias the valves closed. The orifice associated with the valve 26 is much larger than the orifice associated with the valve 28. The capacity of the valve 26 is therefore correspondingly larger than the capacity of the valve 28.

In the illustrated embodiment the valves 26 and 28 are controlled by solenoid drives 36 which are in turn controlled by pulse width modulated (PWM) signals generated by a microcomputer unit (MCU) 34 in response to vehicle or engine speed and applied to the valves through solenoid drivers 36. The PWM signal is a bi-level signal. The valves are fully open when the PWM signal is at one level and fully closed when the PWM signal is at its other level. The percentage of time that a valve is open can therefore be controlled by controlling the duty cycle of the PWM signal.

The microcomputer unit 34 may take any conventional form, but in the described embodiment is a single-chip microcomputer of the type generically known as a 6801. The microcomputer 34 includes an internal read-only memory (ROM) containing the program used by the microcomputer to control the system. The microcomputer 34 also includes an internal clock, a central processing unit (CPU), some scratchpad or random access memory (RAM), various input/output ports, and an interval timer which will be described hereinafter with reference to FIG. 6. The detailed contents of the MCU 34 will not be further described herein (except for the timer, which will be described with reference to FIG. 6), since such information is not necessary to a full and complete understanding of the present invention and is, in any event, readily available from the manufacturer.

Figure 2:
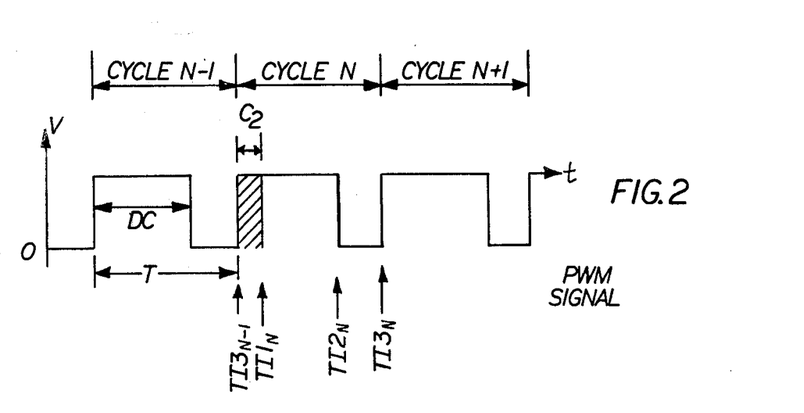
FIG. 2 is a representation of the pulse width modulated signal generated by the microcomputer unit.

The MCU 34 generates a pulse width modulated (PWM) signal having the form generally shown in FIG. 2. This PWM signal is a pulse-type signal having a plurality of pulses of variable duration. The period (T) of the pulse width modulated signal remains constant, and may be on the order of 30 milliseconds in duration. The "on" time of the signal (i.e., the time during which the signal is at a positive voltage level) is variable and is controlled by the microcomputer. The percentage of time that the PWM signal is "on" is referred to as the duty cycle of the signal. The microcomputer 34 generates this signal directly by setting and resetting the logic value of one of its output bits. The MCU 34 also provides a "large valve enable" signal (LVE) which selects the valve to which the PWM signal is applied by the solenoid driver 36.

The MCU 34 generates a control signal (referred to herein as the "master variable") indicating the required flow restriction. The value of the master variable is continually readjusted in accordance with the difference between vehicle or engine speed and corresponding limits. The MCU 34 decides which of the two valves to control and the duty cycle of the PWM signal to be applied in accordance with the value of the master variable. When a substantial restriction of fuel flow is required in order to maintain the vehicle or engine speed within limits, the microcomputer unit 34 provides a pulse width modulated signal to the small valve 28, thereby controlling its effective orifice size. No signal is provided to the large valve 26, whereby its return spring biases it into a closed position. As the required level of fuel flow restriction decreases, the duty cycle of the pulse width modulated signal applied to the small valve 28 increases, eventually reaching a point where the small valve 28 is essentially open all the time. When further reductions in flow restriction are required the microcomputer unit 34 removes the control signal from the small valve 28 (whereby its return spring closes it) and thereafter applies a pulse width modulated signal to the large valve 26 instead. The pulse width modulated signal initially applied to the large valve 26 has a duty cycle such that the fluid flow through the large valve is approximately equal to the maximum fuel flow through the small valve 28. Because of this, little disruption in fuel flow occurs as a result of the changeover between the valves. If the microcomputer unit 34 then determines that greater fuel flow restriction is necessary than is provided by this minimum duty cycle, the large valve 26 will again be closed and the small valve 28 instead modulated.

By this arrangement, low fuel flow rates can be controlled quite readily since large variations in the duty cycle of the small valve 28 produce only relatively small changes in fuel flow restriction and thus in fuel flow. The large valve 26 cannot readily control these small fuel flows since it is would have to remain closed most the time to provide such low fuel flow rates; even minor variations in its duty cycle would then result in substantial variations in fuel flow. The small valve, on the other hand, is not adequate to provide full range control of fuel flow to the diesel engine, since even when fully open it provides too much restriction of the fuel flow required by the diesel engine to drive a vehicle at highway speeds. The large valve 26 therefore controls fuel flow when higher flow rates are required.

When the large valve is being modulated, the small valve 28 may be left open or even controlled with the same pulse width modulated signal applied to the large valve 26. It is preferable that the small valve 28 be closed, however, since this reduces the power dissipation of the system.

The solenoid valves 26 and 28 are constructed to have very rapid opening and closing times (on the order of several milliseconds) so that the percentage of open time closely matches the duty cycle of the pulse width modulated signal. Specifically the solenoid valves are designed to have low bobbin (coil) resistances. High levels of current can then be applied through the coils, producing substantial opening force. The current through the coils is reduced after the solenoid valve has opened to reduce power consumption and to prevent the large opening current from burning out the solenoids. Reduction in coil current also speeds the valve closing time by reducing coil energy. Coil current reduction is possible since less current is required to hold the solenoids in their open states than to open them in the first instance. The solenoid valves 26 and 28 also include hardened stops so as to prevent early failure due to the high cycling rates and substantial applied forces.

The microcomputer unit 34 provides a current select signal CS to control the level of current supplied to the solenoids by the solenoid drivers 36. The CS signal is high at the beginning of each PWM period, causing a high level of current to be applied to the solenoid until it has pulled in (i.e., after the valve has opened). After the solenoid has pulled in, however, the CS signal drops to a low logic level, lowering the level of current applied to the solenoid to a holding current adequate to maintain it in its pulled-in condition.

The microcomputer 34 determines how much fuel flow restriction is required by sensing engine speed and vehicle speed and comparing one or the other with a preset limit stored in memory. Fuel flow restriction is increased when vehicle or engine speed exceeds its corresponding limit, and is reduced when vehicle and engine speeds are below their respective limits. Two conventional reluctance-type speed sensors 38 and 40 are included for respectively sensing engine speed and vehicle speed. Each of these speed sensors includes a reluctance wheel 42, 43 which is coupled to be driven by the element whose speed is being sensed. The wheel 42 is driven by an engine part, such as the ring gear associated with the flywheel of the engine, whereas the wheel 43 is driven by the speedometer cable of the vehicle. In each case a reluctance sensor 44, 45 is disposed adjacent the teeth of the reluctance wheel for sensing the passage of the teeth. The outputs of the reluctance sensors are sinusoidal electrical signals having frequencies corresponding to the frequency with which the teeth of the associated reluctance wheel are passing the sensors. The outputs of these reluctance sensors 44 and 45 are applied to conditioning circuits 46 and 47 which square up the sinusoidal waveforms by comparing their amplitude against a preset voltage level. When the sinusoid is above the preset voltage level, the output signal is high. When the sinusoid is below the preset voltage level, the output signal is at a low voltage level. The output of the conditioning circuits 46 and 47 are squarewave signals having frequencies corresponding to the frequencies of the sinusoid at the sensor output.

The vehicle speed signal (VSS) provided at the output of the signal conditioning circuit 47 associated with the vehicle speed sensor 40 is applied to an interrupt of the microcomputer 34. The engine speed signal (ESS) provided at the output of the signal conditioner 46 associated with the engine speed sensor 38 is directed into an input line of the microcomputer 34 associated with its internal timer, to be described hereinafter with reference to FIG. 6. The microcomputer calculates vehicle and engine speed from the VSS and ESS signals.

The microcomputer unit 34 generally operates in either a road speed limiting mode or an engine speed limiting mode, wherein the vehicle or engine speed is compared against a predetermined maximum level or limit stored in memory. When the actual vehicle or engine speed is below the corresponding limit, the microprocessor reduces the flow restriction provided by valve assembly 24 in an attempt to bring the vehicle or engine speed up to the limit. If the engine speed and vehicle speed remain below their limits, the microcomputer unit 34 will eventually cause the large valve 26 to effectively operate at a 100% duty cycle so that essentially no restriction in fuel flow is provided thereby.

If the operator depresses the foot pedal 20 to the point that either the engine speed or vehicle speed exceeds its predetermined limit, the microcomputer unit 34 responds by reducing the duty cycle of the PWM signal applied to the large valve 26, thereby reducing rail pressure and reducing the speed of the diesel engine 10. As the operator depresses the foot pedal 20 further, the duty cycle of the pulse width modulated signal applied to the large valve 26 continues to diminish correspondingly, thereby continually limiting the speed of the diesel engine such that the predetermined vehicle and engine speed limitations are not exceeded. If the operator then lets up on the pedal 20, the engine and vehicle speed will drop below the limit. The MCU 34 will increase the duty cycle of the PWM signal, maintaining the engine or vehicle speed at the limit if the position of the pedal 20 would otherwise produce a speed above its corresponding limit. The duty cycle will eventually again reach its maximum limit, after which further releases of the pedal 20 will be accompanied by engine and vehicle speed reduction.

The FIG. 1 embodiment includes additional elements which are used in a cruise control mode or in a variable engine speed governing mode. These elements include an array of switches 48 and a throttle actuator 50 with its associated solenoid driver 52. The cruise control and variable speed governing modes are very similar except that vehicle speed is controlled in the cruise control mode and engine speed is controlled in the variable speed governing mode. The variable speed governing mode is only operative when the vehicle is stopped. In these modes the vehicle or engine speed limit is manually variable and the throttle actuator 50 engaged so that the throttle is wide open. The engine therefore accelerates to the manually set vehicle or engine speed limit, and remains at that limit.

Two of the switches 54 and 56 are manually controlled switches operable to set the vehicle into a cruise control or variable speed governing mode. The remaining two switches 58 and 60 are microswitches associate with the clutch and brake pedal, respectively, on the vehicle. Switches 58 and 60 enable the driver to take the system out of the cruise control or variable speed governing mode by depressing either the clutch or the brake pedal.

Each of the switches 54–60 is coupled in series with a corresponding limiting resistor 62 between a +V voltage source and ground. The voltage at each of the junctions between a resistor 62 and a corresponding switch 54–60 is provided to one of the input lines of the microcomputer unit 34, whereby the microcomputer unit 34 can sense the positions of the switches by reading the voltages on the input lines.

When the microcomputer 34 detects that the switches 54, 56 have been operated so as to place the system in a cruise control mode, the microcomputer 34 applies a high logic level to the solenoid driver 52, which opens the solenoid associated with the pneumatic actuator 50. The pneumatic actuator is coupled to the accelerator pedal 20 and when actuated fully retracts the pedal to the floor against the bias of spring 22. This fully opens the throttle valve 18 so that speed limitations are thereafter maintained by the valve assembly 24 exclusively. The air supply required for the pneumatic actuator 50 is readily available in most diesel trucks. Where such an air supply is not available, other actuators may be substituted.

If either the brake or the clutch pedal is depressed after the system is in a cruise control or variable speed governing mode, the microcomputer unit 34 notes that the corresponding switch 58 or 60 has closed. In response, the MCU 34 drops the system out of the cruise control mode or variable speed governing mode. The solenoid driver 52 is disabled, and the pedal is returned to its original position by the spring 22.

Figure 3:
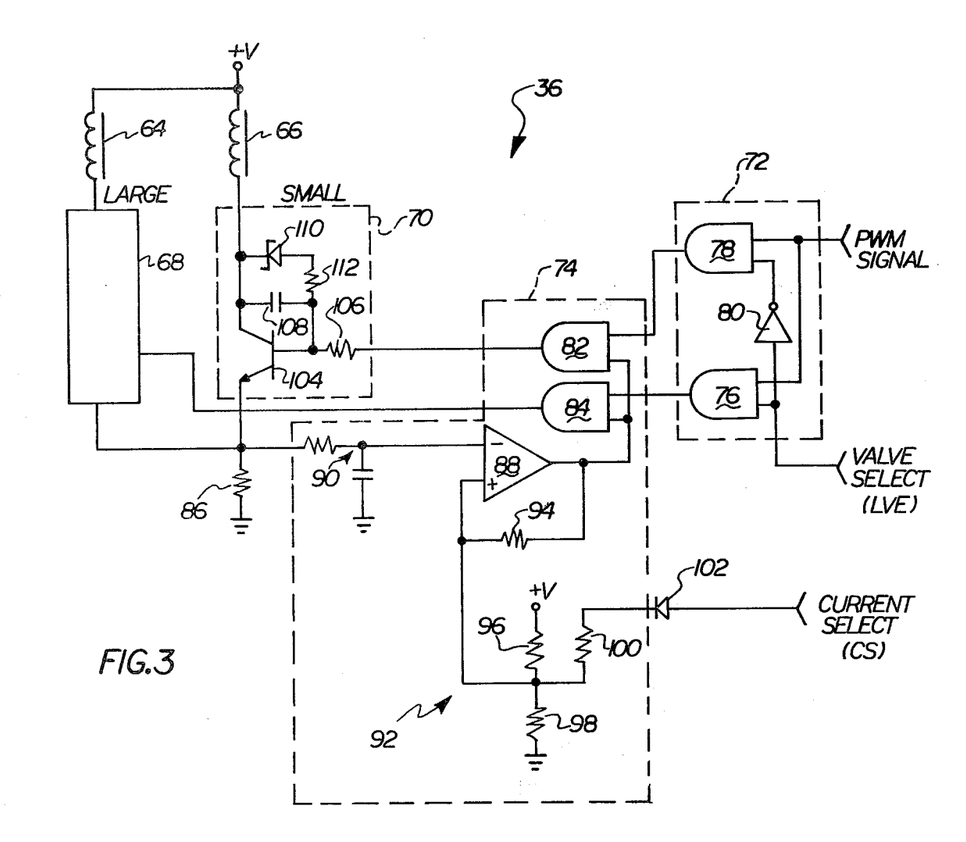
FIG. 3 is a more detailed circuit schematic of the solenoid drivers for driving the large and small valves of the system of FIG. 1.

FIG. 3 illustrates the solenoid drivers 36 of FIG. 1 in greater detail. As can be seen in this Figure, the large and small solenoid coils 64 and 66 are each coupled in series between a +V supply and ground through corresponding transistor switching circuits 68 and 70. The two transistor switching circuits are in turn controlled by output signals provided by control circuitry including a signal steering circuit 72 and a current limiting circuit 74.

The microcomputer unit 34 applies three different control signals to the solenoid drivers: the pulse width modulated signal PWM; the valve select control signal LVE; and the current select signal CS. The PWM and LVE signals are both applied to the steering circuitry 72. This circuit gates the PWM signal to one or the other of the transistor switching circuits 68 or 70 in accordance with the logic state of the LVE signal.

The steering circuit 72 includes two AND gates 76 and 78, each of which has the pulse width modulated signal applied to one of its inputs. The valve select signal LVE is directly applied to the other input of AND gate 76 and indirectly applied to the other input of AND gate 78 through a logic inverter 80. When the valve select signal LVE is at a high logic level the AND gate 76 is enabled and the AND gate 78 is disabled, whereby the pulse width modulated signal appears at the output of AND gate 76 only. Since the output of AND gate 76 is routed to the transistor switching circuit 68 for the large valve, this has the effect of applying the PWM signal to the large valve only. When the valve select signal LVE is at a low logic level, however, the AND gate 76 is disabled and AND gate 78 instead enabled. The pulse width modulated signal is then routed to the transistor switching circuit 70 and applied to the small valve alone.

The outputs of the two AND gates 76 and 78 are gated to the inputs of the transistor switching circuits 68 and 70 by two AND gates 82 and 84 associated with the current limiting circuit 74. Gates 82 and 84 are disabled whenever the current through one of the solenoid coils exceeds predetermined limits. The current passing through the enabled one of the two solenoids is detected by means of a current sensing resistor 86 connected between both of the switching circuits 68 and 70 and ground. Since only one of the switching circuits 68 and 70 is active at a given time, the level of current passing through the sensing resistor 86 directly reflects the level of current passing through the active one of the two solenoid coils 64 and 66. The voltage appearing across the current sensing resistor 86, which indicates the level of the current through the resistor 86, is applied to the input of a comparator 88 through an RC low-pass filter circuit 90. The other input to the comparator 88 is a reference voltage supplied by a reference circuit 92. The comparator 88 compares these two inputs, and includes a positive feedback resistor 94 to provide a small degree of hysteresis in its switching characteristics.

The output of comparator 88 is applied to one input of both AND gates 82 and 84. Comparator 88 therefore controls the enablement and disablement of the gates. Whenever the voltage across the current sensing resistor 86 exceeds the reference voltage provided by the reference circuit 92, the output of the comparator 88 drops to a low voltage level. Both of the AND gates 82 and 84 are disabled, preventing the application of the pulse width modulated signal to either of the transistor switching circuits 68 and 70. The current through the enabled solenoid coil 64 or 66 is cut off, and the voltage across the current sensing resistor 86 drops. When the voltage across resistor 86 drops below the reference voltage generated by the reference circuit 92, the output of the comparator 88 again shifts to a high level. This enables both of the AND gates 82 and 84 and permits the application of the pulse width modulated signal to the enabled transistor switching circuit 68 or 70.

The cycling of the current limiting loop, as described above, occurs at a much higher frequency than the frequency of the applied pulse width modulated signal. Because of the high frequency of the cycling, the enabled transistor switching circuit 70 or 68 operates in its linear region. The net effect of the cycling is to limit current through the solenoid coil to the level determined by the reference voltage applied to the comparator 88 by the reference circuit 92.

Preferably, the current through the selected coil 64 or 66 will be permitted to increase to a high level for a brief interval after each rising edge of the pulse width modulated signal, whereafter it is reduced to a lower, holding current. The solenoid therefore pulls in very rapidly but does not operate at a high power dissipation level thereafter. This operation is controlled by the current select signal CS provided by the microcomputer unit 34. The CS signal is applied to the reference circuit 92.

The reference circuit 92 includes two resistors 96 and 98 connected in series between a +V supply and ground. Also connected to the junction between the two resistors is a third resistor 100 which is coupled to the current select CS output of the MCU 34 through a diode 102. When the CS output of the microcomputer unit is at a low logic level, the diode 102 effectively decouples the resistor 100 from the CS output so that the reference signal is established exclusively by the ratio of the resistances 96 and 98. When the current select signal CS is at a high logic level, however, the diode 102 is forward biased and the resistor 100 is effectively placed in parallel with the resistor 96, substantially increasing the reference signal applied to the comparator 88. The three resistances 96, 98 and 100 are selected so that when the current select signal is at a high logic level, a high current on the order of, e.g., several amps is permitted to pass through the enabled solenoid coil. When the current select signal CS is low, however, the solenoid coil current is limited to a much lower current level, e.g., several hundred milliamps.

At the beginning of each period of the pulse width modulated signal (indicated as time T13 in FIG. 2), the microcomputer sets both the pulse width modulated signal PWM and the current select signal CS to high logic levels (i.e., logic "1") and sets the valve select signal LVE at a logic level indicative of which of the two valves is to be controlled by the PWM signal. After a predetermined period (indicated as time interval C2 in FIG. 2, concluding at time TI1) has elapsed which is adequate to permit the valve to pull in, the microcomputer resets the current select signal CS to a low logic level (i.e., logic "0"), thereby dropping the solenoid coil current to a holding current level. At the conclusion of the duty cycle (i.e., at time TI2), the pulse width modulated signal PWM is also reset to 0, thereby disabling whichever of the transistor switches 68 or 70 was active and causing the solenoid to drop out.

Only the transistor switching circuit 70 is shown in detail in FIG. 3, since the transistor switching circuit 68 is substantially the same. As shown in FIG. 3, the transistor switching circuit 70 includes an NPN transistor 104 having its collector-emitter current path connected in series between the solenoid coil 66 and the current sensing resistor 86. The base of this transistor 104 is connected to the output of the AND gate 82 in the current control circuit through a base current limiting resistor 106. When the output of AND gate 82 is high, base current is supplied to the transistor 104 and it is turned on. When the output of AND gate 82 is low, however, no base current is supplied to the transistor 104, hence it is turned off.

A capacitor 108 is connected between the collector and the base of transistor 104 so as to slow down the turn off time of the transistor 104 and thereby minimize radio frequency (RF) emissions as a result of rapid switching thereof. A zener 110 is connected in series with a current limiting resistor 112 across the collector and base of the transistor 104 in order to reduce the turn off time of the solenoid by providing a low impedance path for the solenoid current when the transistor 104 turns off. When the transistor 104 turns off, a flyback voltage in excess of the zener voltage appears at the collector of the transistor 104. This causes the zener 110 to conduct, providing base current to the transistor 104 and establishing a low impedance path for the current from the solenoid 66 to ground until the flyback voltage decays to the point that the zener 110 drops out of conductance.

Figure 4:
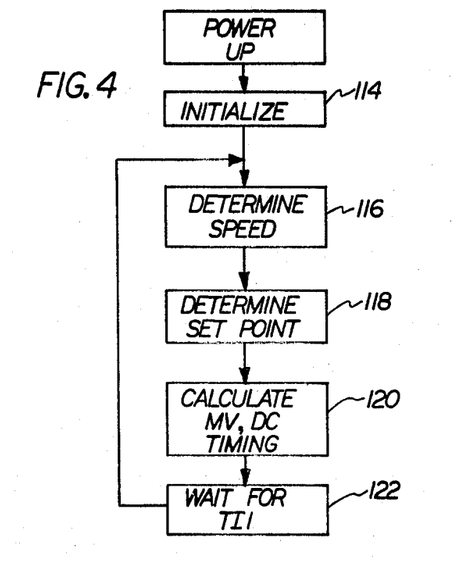
FIG. 4 is a flow chart illustrating the overall flow of operations performed by the microcomputer unit.

FIG. 4 illustrates in broad form the overall flow of operations performed by the microcomputer unit 34 in controlling the operation of the diesel engine 10. Upon power up, the microcomputer goes through an initialization routine 114 which is of conventional form and will not be described in detail herein. This initialization routine essentially sets the initial values of all registers in the microcomputer unit, sets internal flags to initial states, etc. Thereafter, the microcomputer unit performs a routine 116 for determining the speed of the engine. (Vehicle speed is determined in a different manner, described hereinafter with reference to FIG. 9.) A routine 118 is then performed to determine the selected speed set point. In the routine 120, the microcomputer determines speed error by comparing the actual speed with the set point speed, and uses this error signal to determine the new value for a "master variable". The master vehicle is then used to determine which valve to control in the next cycle and the duration for which that valve is to be on in the next cycle. From this the microcomputer determines the times TI1, TI2, and TI3 for the next cycle. The microcomputer then waits for the conclusion of the present period T, after which it returns to step 116 to begin the process anew.

It should be noted that the normal program consisting of the routines 116–122 of FIG. 2 serve only to calculate the times TI1, TI2, and TI3 for the next cycle. The actual timing and control of the output signals LVE, PWM, and CS is accomplished through use of the internal timer in the microcomputer unit 34 in conjunction with an interrupt servicing routine which will be described hereinafter. Each time the timer reaches the end of a preset time interval it generates a "interrupt" signal which causes the microcomputer to interrupt the normal operations described generally above and to jump to a different program, known as an interrupt servicing routine (not shown in FIG. 4), for performing operations which must be accomplished in conjunction with the event which triggered the interrupt.

In the embodiment being described, there are three interrupts generated in each PWM cycle T in response to time outs of the timer. The first interrupt T1 occurs at TI1, which is the conclusion of the time interval during which a high pull in current is supplied to the solenoid. The second interrupt I2 occurs at TI2, which is the conclusion of the "on" portion of the pulse width modulated signal. The third interrupt I3 occurs at TI3, which is the conclusion of the PWM cycle. In the interrupt servicing routine which will be described hereinafter with reference to FIG. 7, the microcomputer determines where it is in the pulse width modulated cycle, sets the three output signals LVE, PWM, and CS applied to the solenoid drivers 36 at appropriate signal levels, and resets the timer with a number corresponding to the time of occurrence (TI1, TI2, or TI3) of the next timer interrupt. This is described hereinafter with reference to FIG. 7.

Figure 5:
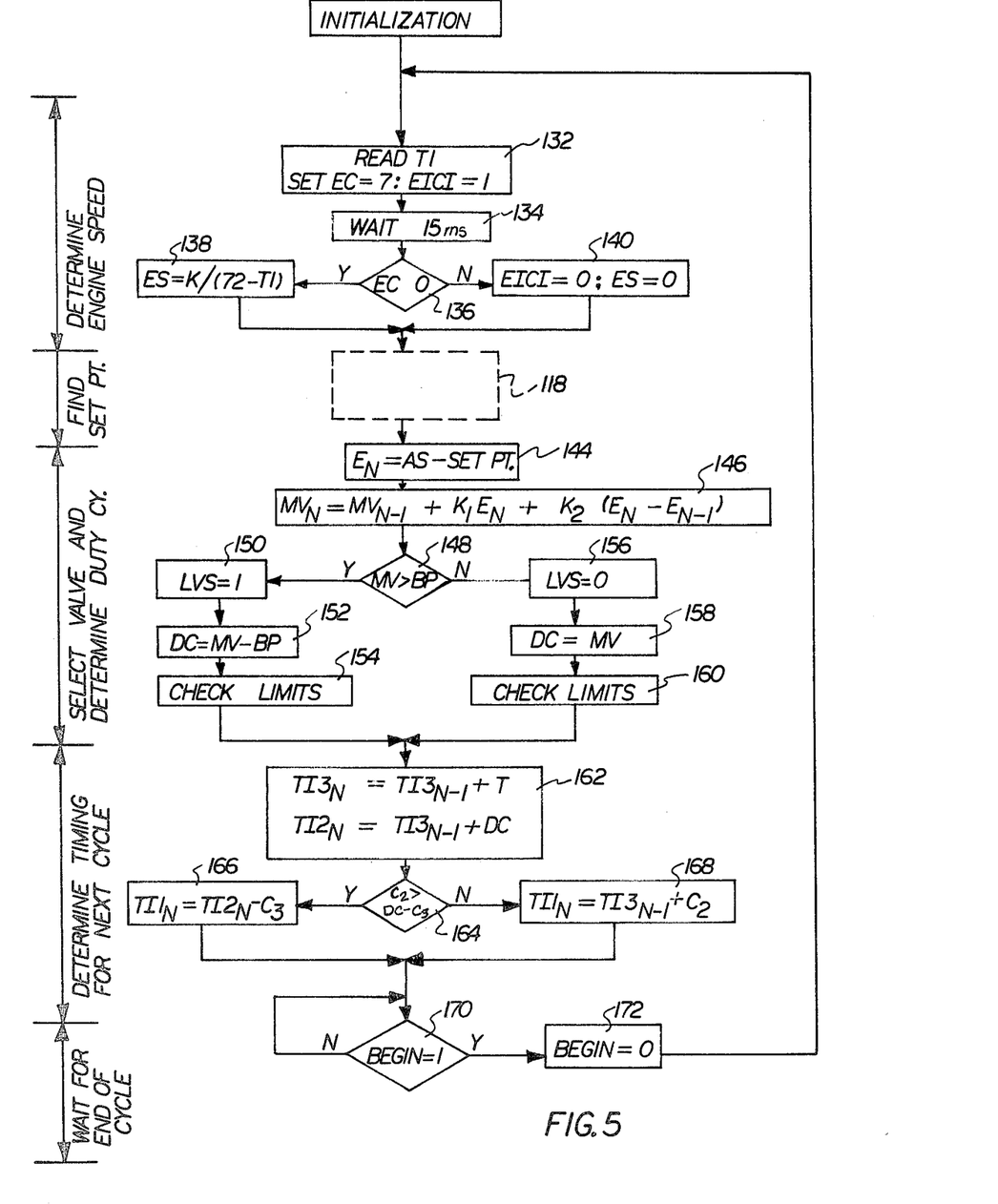
FIG. 5 is a more detailed flow chart illustrating the operations performed by the microcomputer unit.

FIG. 5 is a flow chart illustrating in greater detail the operations performed by the microcomputer during its normal programmed operation (i.e., when not servicing an interrupt). The microcomputer will perform each of the steps illustrated in FIG. 5 in each 30 millisecond period T, and will return to the beginning of the program at the conclusion of each interval T.

After completing the initialization routine illustrated as routine 114 in FIG. 4, the microprocessor proceeds on with the first step in the procedure which determines the speed of the engine. This procedure operates in conjunction, again, with the internal timer of the microcomputer unit 34. A general description of the pertinent parts of this timer is therefore in order.

Figure 6:
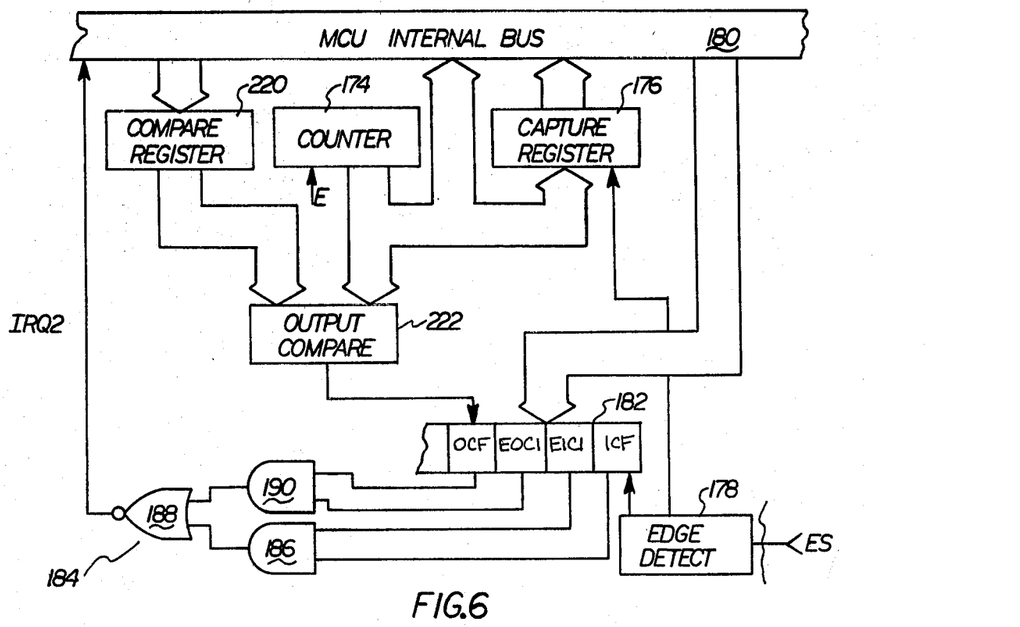
FIG. 6 is a block diagram illustrating in simplified fashion the contents of the timer included in the microcomputer unit of FIG. 1.

The timer is shown in greater detail in FIG. 6. The heart of the timer is a 16 stage, free running counter 174 which receives clock signals E internally generated within the microcomputer unit. The counter runs continuously; it is neither stopped nor reset during normal operation of the system, although it will periodically overflow. The output of the counter 174 is directed to an input capture register 176 which is controllable to store a timer reading without stopping or otherwise interfering with the operation of the counter 174. The capture register 176 is loaded with a counter reading whenever strobed by a pulse provided by an edge detection circuit 178. The edge detection circuit, in turn, is responsive to a signal applied to an input of the microcomputer, in this case the engine speed signal ESS provided by the signal conditioning circuit 46 associated with the engine speed sensor 38. Each time a falling edge occurs in the squarewave engine speed signal ESS, the edge detect circuit 178 provides a strobe pulse to capture register 176, which then stores therewithin the present count of the counter 174.

The output of the input capture register 176 is directed to the internal data bus 180 of the microcomputer. Thus, the microcomputer can read the capture register 176 and thereby determine the count which had been contained within the counter 174 at the time of occurrence of the falling edge of the engine speed signal. A status register 182 is provided in the timer for generating signals informing the microcomputer that an edge has occurred and that the capture register 176 therefore contains a count which is to be read. The status register 182 is eight bits long. For present purposes, however, only four bits are important. Two of the four bits (OCF and ICF) are flags which are set by events occurring within the timer, whereas the remaining two bits (EOCI, EICI) are MCU controlled bits which are set or reset under control of the microcomputer from the microcomputer's internal bus 180. The timer includes a gating network 184 which responds to the values of the bits contained within the status register 182 to generate an interrupt request signal IRQ2 which is supplied to an interrupt input of the central processing unit (not shown separately) contained within the microcomputer unit. When this interrupt signal occurs, the processor suspends its normal programmed operations and enters the interrupt servicing routine which will be described hereinafter with reference to FIG. 7.

Returning to FIG. 5, the microcomputer, during its normal programmed operations, proceeds through steps 132-140 in order to determine the engine speed. In general terms, the microcomputer measures the period of time required for seven edge signals to occur in the engine speed signal, and then determines engine speed by dividing a constant by this time interval measurement.

Figure 8:
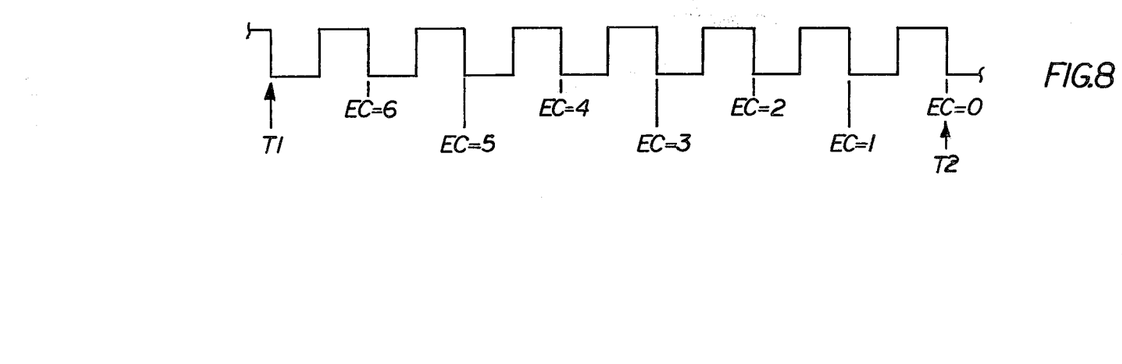
FIG. 8 is a representation of the engine speed signal and is useful in understanding the fashion in which the engine speed is determined by the microcomputer unit.

In step 132 the microcomputer reads the contents of the input capture register to determine the time of occurrence TI1 of the immediately preceding falling edge in the engine speed signal (see FIG. 8, which is a graphical representation of the engine speed signal). The microcomputer also sets an "edge count" integer EC to an initial value of 7, and enables edge signal interrupts by setting the "enable input capture interrupt" (EICI) bit in the status register 182 to a value of 1. The microcomputer then enters a wait loop for approximately 15 milliseconds, during which the MCU will be periodically interrupted due to the occurrence of edges in the engine speed signal.

Whenever an edge occurs in the engine speed signal ESS, the edge detect circuit 178 (FIG. 6) strobes the present contents of the counter 174 into the capture register 176 and sets the input capture flag ICF in the status register 182 to a high logic level. AND gate 186 has its two inputs connected to the ICF and EICI outputs of the status register 182. As stated above, the EICI bit was set to a high logic level in step 132. When the ICF bit is set high due to the occurrence of an edge, both inputs to the AND gate 186 are high, whereby its output also goes to a high logic level. A NOR gate 188 has two inputs, one connected to the output of AND gate 186 and the second connected to the output of another AND gate 190. When the output of AND gate 186 goes to a high logic level, the NOR gate 188 applies a low logic level signal on the interrupt request line IRQ2, thereby interrupting the normal operations of the microprocessor. The microprocessor then suspends normal operations and jumps to the interrupt servicing routine shown in FIG. 7.

The microcomputer must first determine what caused the interrupt. This is necessary since the interrupt request line IRQ2 can be forced to a low logic level not only when a falling edge occurs in the engine speed signal, but also when a certain other timer or non-timer related events occur. The procedure performed by the microprocessor to locate the origin of the interrupt request is designed into the microcomputer by the manufacturer and will not be described herein for that reason.

Figure 7:
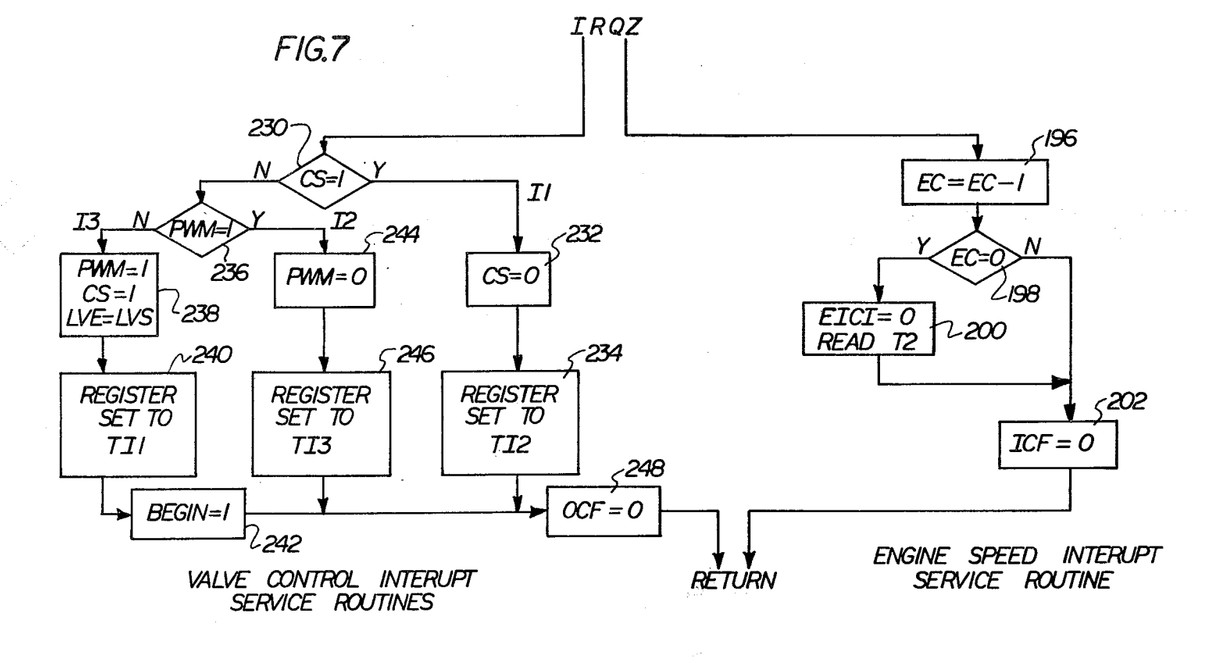
FIG. 7 is a flow chart illustrating the timer interrupt servicing routine performed by the microcomputer.

Since the interrupt was caused by the occurrence of a falling edge in the engine speed signal, the microcomputer will jump to step 196 of FIG. 7, which is the first step in the engine speed interrupt service routine. In step 196 the microcomputer decrements the value of the edge count integer EC which had initially been set to a value of 7 in step 132 of the normal programmed operation shown in FIG. 5. In step 198 the microcomputer test the value of the edge count integer EC. If EC is equal to 0, then seven full periods of the engine speed signal have elapsed and it is time to read the contents of the capture register 176 once again (see FIG. 8). This is accomplished in step 200, wherein the EICI control bit is returned to 0 so that further edge signals do not produce interrupts, and the current contents (T2) of the input capture register are read.

If the edge count is found to be not equal to 0 in step 198, the microcomputer bypasses step 200 and proceeds on with step 202 instead. In step 202 the input capture flag ICF is reset to a value of 0, thereby removing the low signal from the IRQ2 line. The microcomputer then exits the interrupt servicing routine and returns to its normal operation at the point at which it was interrupted.

If the engine is running, 15 milliseconds will be more than adequate for seven full cycles of the engine speed signal to occur. Consequently, at the end of the waiting step 134 (FIG. 5) seven interrupts should have occurred and the edge count signal EC should have a value of 0. In step 136, the integer EC is tested. If it does have a value of 0 the microcomputer proceeds on to step 138, where it sets the engine speed ES equal to a constant divided by the difference between the times of occurrence of the last edge of the seven cycles (T2) and the first edge of the seven cycles (T1). If it is found in step 136 that the engine count variable does not have a value of 0, however, then it is presumed that the engine is stopped. The microprocessor then proceeds to step 140 wherein the engine speed signal ES is set equal to 0 and the EICI flag of the status register 182 is set equal to 0, thereby disabling any further interruption of the microcomputer due to the occurrence of the edge signals.

After both step 138 and step 140, the microprocessor proceeds on to procedure 118 wherein the set point is determined against which the engine (or vehicle) speed is compared. The actual manner in which the set point is derived will vary with the application in which the system is being used. One possible form of the procedure for selecting a set point will be described hereinafter with reference to FIG. 10. It should be appreciated, however, that the set point may merely be a single value stored in the read only memory (ROM) of the microcomputer unit. Alternatively, a plurality of different set points could be stored within the microcomputer and could be selected by the operator by depressing appropriate ones of the switches 48 shown in FIG. 1. The set point may, on the other hand, be derived from a potentiometer having a manually variable wiper arm and therefore providing an analog signal having a continuously variable value. The analog signal could be converted into a digital signal by an A-D converter (not shown) and then fed into one of the input ports of the microcomputer.

In any event, upon the conclusion of the procedure which determines the set point, the microcomputer proceeds on with step 144. In this step the present value of the speed error ($E_n$) is set equal to the difference between the actual speed AS (which may be either engine speed or vehicle speed) minus the set point determined in step 142. In the next step 146 the microcomputer calculates the new value $MV_n$ of a master variable MV. This master variable MV has values ranging from 0 to a maximum limit of, for example, 60,000, and will have its value adjusted in accordance with the error signal $E_n$. In step 146, the new master variable number $MV_n$ is set equal to the old master variable number $MV_{n-1}$ plus: (1) a constant $K_1$ times the present error $E_n$, and (2) a constant $K_2$ times the difference between the present error $E_n$ and the error in the last cycle $E_{n-1}$.

The relationship between the error and the master variable number represents a proportional-plus-integral characteristic. The integral aspect of this characteristic is included to insure that the steady state speed error is zero. This would not be the case if a strictly proportional characteristic were employed.

In steps 148-160 the microcomputer determines, based upon the master variable number, which of the two valves to enable and the duty cycle of the signal to be applied to that valve in the next PWM cycle. In step 148 the value of the master variable is compared against a break point, corresponding to the master variable number at which the transition between the large valve 26 and the small valve 28 occurs. This will preferably be approximately one-half of the maximum master variable number, or approximately 30,000 in the example being described. If it is determined in step 148 that the master variable value is greater than the break point, the program proceeds on with step 150. Otherwise, the program jumps to step 156.

When the master variable has a value greater than the break point, the large valve is to be enabled. Consequently, in step 150 the valve select signal (LVS) is set to a logic value of 1. In step 152 the duty cycle DC of the pulse width modulated signal (corresponding to the total ON time in the 30 millisecond PWM period) is set equal to the difference between the master variable number and the break point number. In step 154 this duty cycle number DC is compared against preset limits. If the duty cycle is found to be below a preset minimum limit, corresponding to the duty cycle value when the flow through the large valve is approximately equal to the maximum flow through the small valve, the duty cycle value is reset to this lower limit. Similarly, if the duty cycle value exceeds a predetermined maximum limit (corresponding to an approximately 98% duty cycle), then the duty cycle is reset equal to this maximum duty cycle value. After this, the program jumps to step 162.

If it is instead determined in step 148 that the master variable number is smaller than the break point, the small valve is to be enabled. In this event the microprocessor jumps to step 156, where the large valve select signal LVS is set equal to 0. In step 158 the duty cycle value DC is set equal to the master variable value. In step 160 the duty cycle value DC is compared against predetermined maximum and minimum limits. The limits are provided to ensure that the duty cycle of the signal applied to the small valve never drops below approximately an 8% duty cycle or above approximately a 98% duty cycle. If the duty cycle value is beyond one of the limits, it is reset to that limit. The program then proceeds on with step 162.

In steps 162-168 the microcomputer determines the proper time of occurrence of each of the three events TI1, TI2 and TI3 of the next 30 millisecond cycle (see FIG. 2) from the duty cycle number found in the preceeding steps. Before discussing steps 162–168 in detail, attention is once again directed to the timer illustrated in FIG. 6 for a general discussion of the manner in which the timer is used to control the times of occurrence TI1, TI2, and TI3 of the three timed events I1, I2 and I3 in each 30 millisecond cycle.

The timer includes an output comparison register 220 in addition to the counter 174 and the capture register 176. The output comparison register 220 is loadable from the internal bus 180 of the microcomputer. The output of the comparison register 220 is compared with the output of the free running counter 174 in an output comparison circuit 222. When the two values applied to the inputs of the output comparison circuit 222 are equal, the output comparison circuit 222 provides an output pulse which sets the value of the output comparison flag OCF of the status register 182 to a logic value of 1. This causes an interrupt if the enable signal (EOCI) for the output comparison interrupt has been set to a logic value of 1 previously. In the embodiment being described, the EOCI bit contained within the status register 182 is set during the initialization procedures 114 conducted upon initial power up of the system. Consequently, each time the OCF flag goes high the output of AND gate 190 similarly goes high, causing an interrupt request to be placed on the IRQ2 line.

In response to each interrupt request, the MCU 34 reloads the comparison register 220 with a new number identifying the number which the counter 174 will contain when the next interrupt is to occur. Thus, when the I1 interrupt occurs, the comparison register 220 will be loaded with a number TI2 corresponding to the count which the counter 174 will contain at the desired time of occurrence of the second interrupt I2. Similarly, at that second interrupt the comparison register 220 will be loaded with the number TI3 corresponding to the count which the counter 174 will contain at the desired time of occurrence of the third interrupt I3, etc.

It is therefore necessary for the microcomputer to calculate the number which the counter 174 will contain at the desired times of occurrence of the three interrupts I1, I2 and I3 for the coming PWM cycle. This is the function of the steps 162–168 of FIG. 5.

In step 162 the time of occurrence $TI3_n$ of the last interrupt of the next cycle is determined by adding the duration of a single cycle (T) to the value contained within the counter 174 at the time of occurrence $TI3_{n-1}$ of the last interrupt of the present cycle. Also in this step, the time of occurrence $TI2_n$ of the conclusion of the ON period of the pulse width modulated signal in the next cycle is determined by adding the duration of the duty cycle (determined in step 152 or 158) to the time of occurrence of the end of the present cycle ($TI3_{n-1}$).

The calculation of the time of occurrence $TI1_n$ of the first interrupt $I1_n$ is somewhat more complicated since it is possible for the duration of the duty cycle DC to be smaller than the fixed duration $C_2$ of the period during which high current is provided to the solenoid valves to enhance the pull in speed of the solenoids. In step 164 the microcomputer determines whether the high current interval $C_2$ is greater than the duty cycle interval DC minus a small offset $C_3$. The time offset $C_3$ represents the time required for the microcomputer to completely service the first interrupt I1. If the duty cycle minus the time differential $C_3$ is not smaller than this high current interval $C_2$, then the time of occurrence of the first interrupt $TI1_N$ is set equal to the time of occurrence of the last interrupt $TI3_{n-1}$ of the present cycle plus the fixed length of the interval $C_2$. This is determined in step 168. The computer thereafter jumps on to step 170. If, on the other hand, it is determined in step 164 that the length of the duty cycle minus $C_3$ is shorter than the duration of the interval $C_2$, then the microcomputer jumps to step 166. In this step the time of occurrence of the first interrupt $TI1_n$ is set equal to the time of occurrence of the second interrupt $TI2_n$ minus the offset $C_3$. After step 166 the microcomputer jumps on to step 170.

The steps which have been heretofore described will, even at worse case, take substantially less than the 30 milliseconds allotted to each cycle of the pulse width modulated signal. Since it is not desired to begin the program anew until the conclusion of the current cycle, the microprocessor must now wait for the last interrupt TI3 of the present cycle. At that time, the microcomputer will jump back to step 132 and begin the process all over again. A flag referred to herein as the "begin" flag is used for this purpose. This flag has a value of 0 normally, but is set to a value of 1 in the interrupt servicing routine which occurs in response to the last interrupt of the present cycle.

In step 170 the microcomputer tests the value of the begin flag, and keeps repeating the instruction as long as this flag has a value of 0. The interrupt I3 interrupts this cycling, but the MCU 34 returns to it upon the conclusion of the interrupt servicing routine. As will be described hereinafter with reference to FIG. 8, the interrupt servicing routine sets this begin flag to a logic value 1. Consequently, upon return to step 170 of the normal program, the microcomputer proceeds on to step 172 rather than returning to repeat step 170. In step 172 the begin flag is returned to a value of 0, after which the microcomputer jumps to step 132 to begin the process anew.

The timer illustrated in FIG. 5 generates an interrupt request whenever the count contained within the free running counter 174 equals the number contained within the input comparison register 220. In response the microcomputer suspends whatever normal program operation it was engaged in at the time, determines that the interrupt request was generated as a result of an output comparison flag, and jumps to the valve control interrupt servicing routine illustrated in FIG. 7.

The purpose of the first two steps 230 and 232 of the valve control interrupt service routine is to determine whether the interrupt was the I1, I2, or I3 interrupt. In step 230 the microcomputer examines the value of the CS signal. If it is high, then the interrupt must have been caused by the TI1 timeout. The current supplied to the solenoid valve should be reduced, therefore, to a holding current level. In step 232 this reduction is accomplished by setting the output bit CS equal to 0. In step 234 the output comparison register 220 is set with the number TI2 representing the time of occurrence of the next succeeding interrupt I2. The microcomputer then jumps to step 248, wherein the output condition flag OCF is returned to a value of 0, thereby removing the interrupt. The microcomputer then exists the interrupt routine and returns to normal programmed operations at the point of interruption.

If the microcomputer determines in step 230 that the signal CS was not at a logic 1 level, the microcomputer jumps to step 236 rather than proceeding on to step 232.

In step 236 the pulse width modulated signal PWM is tested. If the signal does not have a logic value of 1, then the interrupt must have been produced by the free running timer achieving a count corresponding to a TI3 value. The valve must be turned on, therefore, at a high current level. Consequently, in step 238 both the PWM and CS signals are set to 1 logic levels. In addition, the output bit LVE which selects the valve to be enabled is set equal to the LVS value, as determined in step 150 or 156 of FIG. 5. The microcomputer then proceeds on to step 240 where the output comparison register 220 is set with the number TI1 which the free running counter will contain at the desired time of occurrence at the next interrupt. The "begin" flag is set to a logic value of 1 in step 242, thereby causing the microcomputer to begin a new cycle upon return to the normal programmed operation. The microcomputer then jumps to step 248 to reset the OCF flag and exit the routine.

Finally, if it is determined in step 236 that the PWM signal does have a logic value of 1, then it follows that the I2 interrupt must have caused the entry into the interrupt servicing routine. The microcomputer jumps to step 244, wherein the pulse width modulated signal PWM is reset to a logic value of 0. In step 246 the output comparison register is reset with a number TI3 corresponding to the count which will be contained within the free running counter at the desired time of occurrence of the beginning of the next pulse width modulated cycle. After step 246, the microcomputer continues on with step 248 to reset the OCF flag, and then exits the interrupt servicing routine.

In the embodiment being described the set point can be either an engine speed or a vehicle speed set point. In order to compare the set point against vehicle speed, it is necessary to know the speed at which the vehicle is travelling. In the embodiment currently being described, vehicle speed is determined in a somewhat different manner than engine speed. This is because the frequency of the squarewave vehicle speed signal VSS is only approximately one tenth of the frequency of the engine speed signal ESS. There is, therefore, not adequate time in a single pulse width modulation cycle to wait for a number of VSS pulses to occur.

The vehicle speed signal VSS is directed to an interrupt line (known as the "nonmaskable interrupt", or NMI) of the microcomputer unit 34. This interrupt line is different than the interrupt line IRQ2 used by the timer of FIG. 6, is edge sensitive, and is serviced by a separate interrupt servicing routine shown in FIG. 9. Each time a falling edge occurs on the nonmaskable interrupt of the microcomputer unit 34 (i.e., upon each falling edge of the squarewave vehicle speed signal VSS), the microcomputer exits from its normal program (illustrated in FIG. 5) and proceeds to the interrupt servicing routine shown in FIG. 9.

Figure 9:
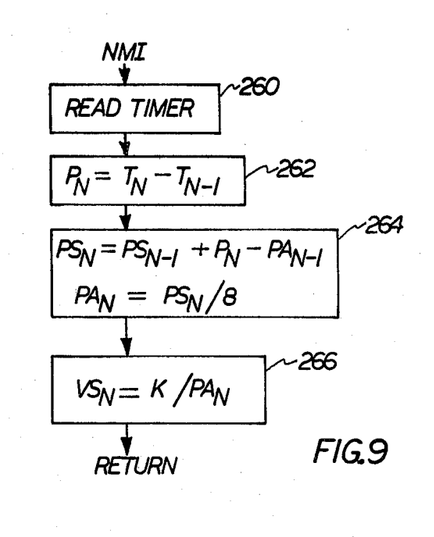
FIG. 9 is a flow chart illustrating the interrupt servicing routine performed by the microcomputer unit in response to an interrupt generated by the vehicle speed sensor.

In the first step 260 of the interrupt servicing routine, the microcomputer reads the count contained within the free running counter 174. In step 262 the microcomputer determines the duration $P_n$ of the last cycle of the vehicle speed signal VSS by subtracting the current timer value $T_n$ from the timer value $T_{n-1}$ at the time of occurrence of the last falling edge of the vehicle speed signal.

In step 264 the microprocessor determines the average period of the vehicle speed signal over the last succeeding eight cycles. A period sum signal $PS_n$ is first updated by adding to the previous value of the period sum signal $PS_{n-1}$ the difference between the period determined in step 262 and an average period $PA_{n-1}$. A new average period is then derived by dividing the updated sum signal $PS_n$ by 8. In step 266 the microcomputer determines an updated vehicle speed value by dividing a constant K by the updated average period $PA_n$ determined in step 264.

Figure 10:
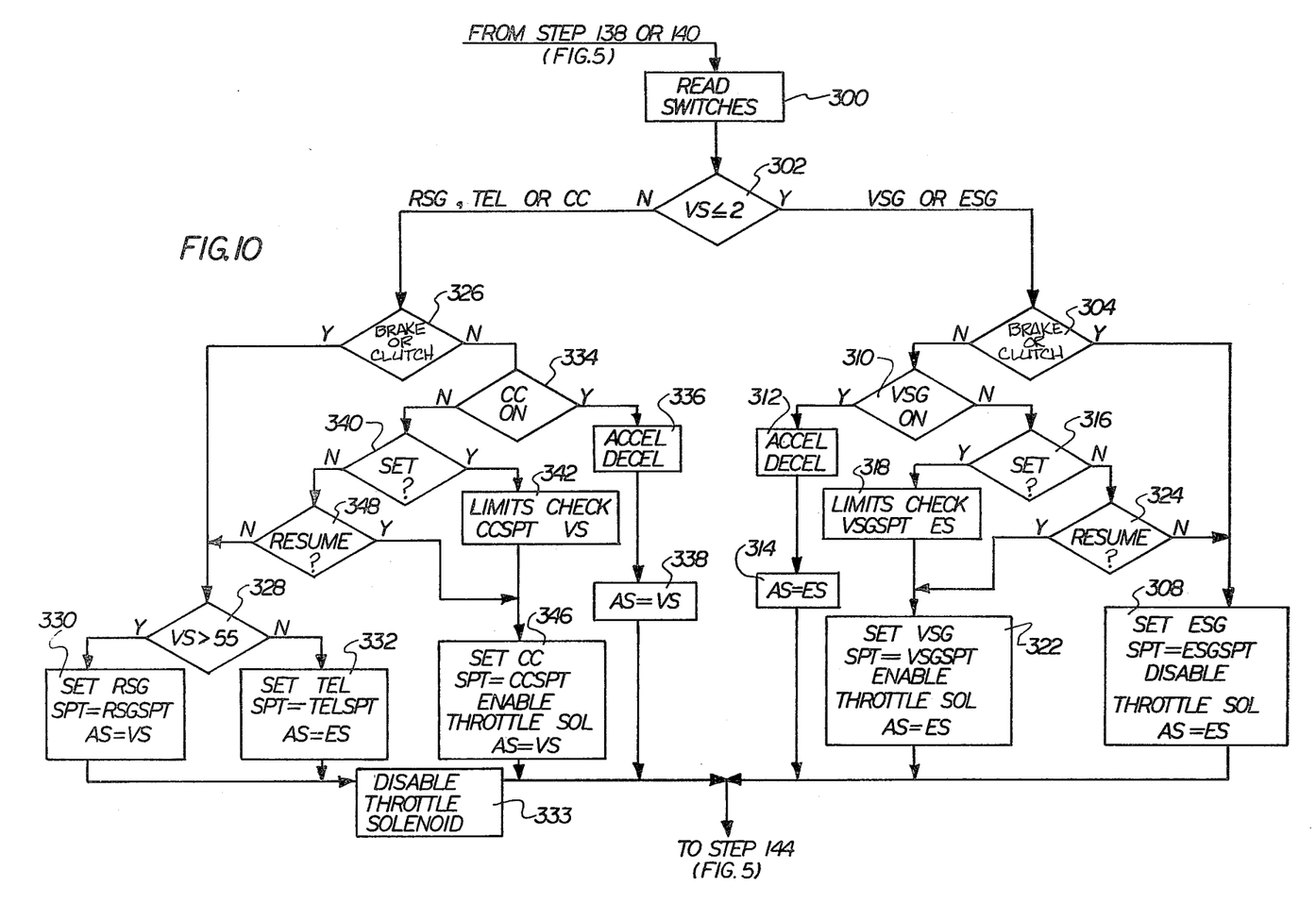
FIG. 10 is a flow chart illustrating the fashion in which the microcomputer determines the vehicle speed or engine speed set point to be used in the calculation of vehicle or engine speed error.

As stated previously, the procedure performed by the microcomputer in determining the set point (step 118 of FIGS. 4 and 5) may take a wide variety of forms. FIG. 10 illustrates but one of these possible forms. This procedure permits the microcomputer to select one of five different operating modes, each having its own associated engine or vehicle speed set point. These modes are as follows:

RSG (Road Speed Governing):

In this mode a set point is selected corresponding with the greatest permissible vehicle speed, usually 55 or 60 mph. The speed error will then correspond to the difference between the vehicle speed and the set point.

TEL (Top Engine Limiting):

In this mode the set point represents the maximum permissible engine speed. The speed error will correspond to the difference between the actual engine speed and the TEL set point.

CC (Cruise Control):

This mode is similar to road speed governing, in that a maximum permissible vehicle speed is selected. The set point, however, is adjustable by the operator. In addition, the microcomputer enables the throttle actuator 50 (see FIG. 1) whereby the throttle is open wide and the fuel flow restriction is determined exclusively by the valve assembly 24. The vehicle will thus accelerate to and remain at the desired set speed. Speed error is determined by finding the difference between vehicle speed and the CC set point.

VSG (Variable Speed Governing):

This mode is similar to the cruise control mode, except that the set point limits engine speed rather than vehicle speed. In order to enter this mode, the vehicle must be stopped. The purpose of this mode is to permit the operator to adjust the operating speed of the engine to control equipment coupled to a power takeoff of the vehicle. The set point in this mode represents a maximum engine speed, and is again selectable by the operator. Furthermore, as in cruise control, the microcomputer enables the throttle actuator 50 so that the throttle valve 18 opens wide and the valve assembly 24 provides complete control of the fuel being supplied to the engine. Speed error is determined by finding the difference between the actual engine speed and the VSG set point.

ESG (Engine Speed Governing):

This mode is similar to the TEL mode, in that the ESG set point represents a maximum permissible engine speed and is not operator controllable. This set point, howerver, only applies when the vehicle is stationary. Its principle application will again be during control of auxiliary equipment through a power take off. Speed error is determined by finding the difference between the engine speed and the ESG set point. As in the RSG and TEL modes, the throttle actuator 50 is disabled.

The top engine and vehicle speed limiting set points (i.e., for the TEL, RSG and ESG modes) are stored in ROM either internal or external to the MCU 34 and are therefore fixed. These values are preferably customer selectable and will be dependent upon engine/vehicle type. Consequently, it is desirable that the set points be stored in a separate ROM (not shown) external to the MCU. It is then unnecessary to change the MCU when a change in the set points is made.

The procedure illustrated in FIG. 10 corresponds to procedure 118 of FIG. 5 and is basically a logic branching operation conducted by the microcomputer during each PWM cycle to determine which mode it should be in. In step 300 the microcomputer reads the logic signals appearing across the switches 48 for use in the remainder of the procedure. In step 302 the microcomputer checks to see whether the vehicle speed (whose value is being continuously determined through the interrupt servicing routine illustrated and described with respect to FIG. 9) is below two miles per hour.

If the vehicle speed is in excess of two miles per hour, the system should be in either the RSG, TEL or CC modes of operation, since these modes are associated with the normal operation of the vehicle on the road. The microcomputer jumps to steps 326-346 to determine which of the three modes it should be in and to select an appropriate set point in accordance therewith.

If the vehicle speed is below two miles per hour, however, the system should be in either the VSG or ESG modes, since these two modes are associated with operation of power take off implements by the engine. In this case the microcomputer proceeds on to steps 304-324 to determine which of the two modes it should be in and the associated set point.

In step 304 the microcomputer examines the logic states of the signals read from the switches 48 in step 300. If the brake or clutch pedal is depressed, then the system should not be in the variable speed governing mode. The microcomputer unit therefore proceeds on to step 308 to set the system in the ESG mode. In step 308 the set point is set to the ESG set point, the throttle solenoid 50 is disabled (regardless of whether it had or had not been enabled in preceding cycles) and the "actual speed" variable AS is set equal to the engine speed ES for use in the next step (step 144 of FIG. 5).

If it is found in step 304 that neither the brake nor the clutch is depressed, then further questions must be answered in order to determine which of the two modes the system should be in. In step 310 the microcomputer examines which mode the system was in in the preceding cycle. If the system was in the VSG mode in the preceding cycle, then the system should remain in a VSG mode in this cycle (because neither the brake nor the clutch has been depressed). The microcomputer thus proceeds on to step 312, which is an optional procedure.

In the optional procedure, the microcomputer determines whether the set or resume button 54 or 56 has been depressed for more than one second. If the set button has been depressed for more than one second, the VSG set point is incremented at a constant rate, producing a steady acceleration of the vehicle. Incrementing continues until the button is released, at which point the VSG set point remains constant. If the resume button has been depressed for more than one second, however, the VSG set point is gradually reduced until the resume button is released. Thereafter, the VSG set point remains constant.

The microcomputer 34 cannot afford to remain in the acceleration/deceleration step 312 for several seconds. The operations described above are therefore performed over a number of successive cycles. After a certain number of cycles corresponding with one second of elapsed time, the microcomputer will either increment or decrement the VSG set point in each succeeding cycle, as long as the set or resume button remains depressed.

In step 314, performed following the optional procedure described above, the microcomputer sets the value of the actual speed variable AS equal to the present engine speed ES. It is then the present engine speed which is compared against the VSG set point in the next step, which is step 144 of FIG. 5.

If it is determined in step 310 that the system was not in the VSG mode in the preceding cycle, the microcomputer must determine whether or not the operator has commanded that it be placed in the VSG mode by depressing either the set or the resume button 54 or 56. The microprocessor begins this procedure in step 316, wherein the switch signals are examined to determine whether the set button is depressed. If the set button is not depressed, the microcomputer jumps to step 324 to check the resume button. If the set button is depressed, however, the microcomputer proceeds on to step 318 to determine whether or not the present engine speed is within acceptable limits for the VSG set point. If it is, the microcomputer sets the VSG set point equal to the present engine speed. If not, the VSG set point is set equal to the limit which was exceeded by the engine speed. The microcomputer then proceeds on to step 322. In step 322 the microcomputer sets the set point equal to the VSG set point, sets the actual speed variable AS equal to engine speed ES, and enables the throttle solenoid. The microcomputer then proceeds on to step 144 of FIG. 5.

The microcomputer arrives at step 324 of FIG. 10 if it is determined in step 316 that the set button is not depressed. In step 324 the microcomputer examines the logic signals provided by the switches 48 to determine whether or not the resume button has been depressed. If the resume button has also not been depressed, then the system should be in the ESG mode and the microcomputer proceeds on to step 308, previously described. If the resume button has been depressed, however, the microcomputer executes step 322, wherein the microcomputer sets the system into the VSG mode as described previously. Again, the microprocessor will thereafter proceed on with step 144 of FIG. 5.

If it is determined in step 302 that the vehicle speed is in excess of two miles per hour, then the microcomputer proceeds on to steps 326-348 to determine whether to be in the RSG, TEL, or CC mode of operation. Steps 326-348 are similar in many respects to the steps 304-324.

In step 326 the microcomputer examines the logic signals provided by the switches, as read in step 300, to determine whether or not the brake or clutch lever is depressed. If the brake or clutch is depressed, the system cannot be placed into the cruise control mode and, if already in the cruise control mode, the system must be taken out of it. The microcomputer thus proceeds on to step 328 to determine whether or not to place the system in the RSG (vehicle speed limiting) or TEL (engine speed limiting) mode. As long as the vehicle speed is below a preset limit (for example, 55 mph) the vehicle speed is acceptable from a vehicle operation standpoint. Consequently, the system should be in the TEL mode to limit the speed of the engine and thereby prevent the engine from being operated at excessively high rpm.

In step 328 the vehicle speed is compared against the preset limit. If the vehicle speed is below the limit, the microcomputer jumps to step 332 to set the system into the top engine limiting or TEL mode. In step 332 the microprocessor sets the set point at the TEL set point and sets the actual speed equal to the present engine speed so that it is the engine speed which is compared against the set point in step 144 (FIG. 5). If it is determined in step 328 that the vehicle speed is above the preset limit, however, the vehicle is placed in the road speed governing mode to assure that the vehicle does not exceed the preset vehicle speed limitation. In this case the microcomputer proceeds on to step 330. In step 330 the microprocessor sets the set point equal to the RSG set point, and sets the actual speed AS equal to the present vehicle speed VS. After both of steps 330 and 332, the microcomputer disables the throttle solenoid in step 333 and then proceeds on to step 144 of FIG. 5.

If it was determined in step 326 that neither the brake nor the clutch was depressed, then it is still unclear into which of the three road operating modes the microcomputer should place the system. Program flow then continues on with step 334, wherein the microcomputer determines whether or not the system was in the cruise control mode in the preceding cycle. If so, the microprocessor proceeds on to step 336 to determine whether or not the operator is requesting for acceleration or deceleration of the vehicle. Step 336 is essentially the same as step 312, and will not be described for that reason. After step 336 the microprocessor proceeds on to step 338 to set the actual speed AS equal to the vehicle speed VS.

If it is determined in step 334 that the system was not in the cruise control mode in the preceding cycle, the microcomputer proceeds to steps 340–348 to determine whether or not to place the system in the cruise control mode. In step 340 the logic signal derived from the set switch is examined to determine whether the set button is being depressed. If it is, the microprocessor proceeds on to step 342 wherein the present vehicle speed is compared against preset limits corresponding to the maximum and minimum speeds at which the cruise control is desired to be operable. If the vehicle speed falls outside of these limits, then the cruise control set point is set equal to the limit which was passed. if the vehicle speed falls within these limits, however, the cruise control set point (CCSPT) is set equal to vehicle speed. The microprocessor then proceeds on to step 346, wherein the microprocessor sets the system into the cruise control mode, makes the set point equal to the cruise control set point, enables the throttle solenoid, and sets the actual speed signal AS equal to the vehicle speed. After step 346 the microcomputer proceeds on to step 144 (FIG. 5).

If it is determined in step 340 that the set button is not being depressed, the microprocessor continues with step 348 to determine whether the resume button is being depressed. If the resume button is being depressed, the microprocessor jumps to step 346 to place the system in the cruise control mode. If the resume button is not being depressed, the microprocessor returns to step 328 to determine whether to place the system in the RSG or TEL modes.

At the conclusion of each of steps 308, 322, 356, 332 or 330, program flow continues with step 144 of FIG. 5 to determine speed error for use in recalculating the master variable, the valve to be energized, and the duty cycle therefor.

An engine speed control system has therefore been described utilizing a fuel flow control including plural fuel flow control valves connected in parallel and operated by PWM signals generated by a microcomputer in accordance with either engine speed or vehicle speed error. The microcomputer causes the small valve to be operated for low fuel flow conditions, and switches to the larger valve when the capacity of the small valve becomes insufficient to supply the desired amount of fluid. Flow charts depicting one possible embodiment of firmware for this system have also been described with particularity.

Although the invention has been described with respect to a preferred embodiment it will be appreciated that various rearrangements and alterations of the parts may be made without departing from the spirit and scope of the present invention, as defined in the appended claims.

What is claimed is:

1. A method of controlling fuel flow from a fuel source to the fuel rail of a fuel injected, internal combustion engine comprising the steps of providing plural fuel flow paths connected in parallel between said source and said fuel rail, providing a control signal in accordance with which fuel flow is to be controlled, controllably pulsing fuel flow through a first of said paths in accordance with said control signal, and providing fuel flow through a second of said paths when a characteristic of said control signal goes beyond a predetermined limit.

2. A method of controlling fuel flow as set forth in claim 1, wherein said step of controllably pulsing fuel flow comprises the steps of periodically restricting fuel flow through said first path for durations controlled in accordance with said control signal so as to thereby control the flow of fuel through said first path.

3. A method of controlling fuel flow as set forth in claim 1, wherein valve means is provided in said first path, and wherein said step of controllably pulsing fuel flow comprises the step of periodically opening and closing said valve means and controlling the percentage of time that said valve means is open in accordance with said control signal so as to thereby control the flow of fuel through said first path.

4. A method of controlling fuel flow as set forth in claim 1, wherein said step of controllably pulsing fuel flow includes the step of controlling a characteristic of said pulsed fuel flow through said first path in accordance with said control signal when said signal has a value which is within a first range of values, and wherein said step of providing fuel flow through said second of said paths comprises the step of providing fuel flow through said second of said paths when said signal has a value which is within a second range of values different than said first range.

5. A method of controlling fuel flow as set forth in claim 4, wherein said step of controlling a characteristic of said pulsed fuel flow comprises the step of providing periodic pulses of fuel flow and controlling the durations of said pulses in accordance with said control signal.

6. A method of controlling fuel flow as set forth in claim 4, wherein said step of providing said control signal includes the steps of sensing a characteristic which is related to fuel flow and adjusting the value of said control signal in accordance with said characteristic, whereby closed loop control of fuel flow is provided.

7. A method of controlling fuel flow as set forth in claim 6, wherein said internal combustion engine is drivingly coupled to a driven element, and wherein said step of sensing comprises the step of sensing the speed of said driven element.

8. A method of controlling fuel flow as set forth in claim 7, wherein said step of adjusting said control signal comprises the steps of determining the difference between the actual and desired speed of said driven element, and adjusting said control signal such that fuel flow to said engine is modified in a direction to which said engine will respond by reducing said difference.

9. A method of controlling fuel flow as set forth in claim 1, wherein said step of providing plural parallel fuel flow paths comprises the step of providing first and second fuel flow paths where the flow capacity of said second fuel flow path is substantially greater than the flow capacity of said first fuel flow path.

10. A method of controlling fuel flow as set forth in claim 9, wherein said step of providing fuel flow through said second of said paths comprises the step of providing fuel flow through said second path when fuel flow in excess of the capacity of said first path is required.

11. A method of controlling fuel flow as set forth in claim 10, wherein said step of providing fuel flow through said second path comprises the step of controlling fuel flow through said second path by controllably pulsing fuel flow through said second path.

12. A method of controlling fuel flow as set forth in claim 11, and further comprising the steps of preventing fuel flow through said second path when fuel flow is being provided through said first path, and preventing fuel flow through said first path when fuel flow is being provided through said second path.

13. Apparatus for controlling fuel flow from a fuel source to the fuel rail of a fuel injected internal combustion engine comprising means defining first and second fuel flow paths adapted to be connected in parallel between said fuel source and said fuel rail, first and second valve means in said first and second fuel flow paths, respectively, said first valve means having a lower fuel flow capacity than said second valve means, each said valve means having open and closed states for restricting or not restricting fuel flow through its associated fuel flow path, and control means for controlling said first and second valve means so as to thereby control fuel flow between said fuel source and said fuel rail, said control means including means for selecting at least one of said first and second valve means and for cyclically opening and closing the selected one of said valve means and controlling the percentage of time that said valve is open, thereby controlling fuel flow to said fuel rail.

14. Apparatus as set forth in claim 13 wherein said means for selecting and cyclically opening and closing at least one of said valve means includes means for generating a pulse width modulated signal and means for applying said pulse width modulated signal to said selected one of said valve means.

15. Apparatus as set forth in claim 13, wherein said control means further includes means for sensing the speed of an engine-driven part, and wherein said means for selecting and cyclically opening and closing at least one of said valve means includes means for comparing said sensed speed to a limit, for adjusting the value of a control signal in accordance with said comparison, and for selecting and cyclically opening and closing said at least one of said valve means in accordance with said control signal.

16. Apparatus as set forth in claim 15, wherein said means for selecting and cyclically opening and closing in accordance with said control signal comprises means for selecting said first valve means when said control signal has a value within a first range of values and for controlling the percentage of time that said first valve means is open in accordance with the location of said value within said first range of values, and for selecting said second valve means when said control signal has a value within a second range of values different than said first and for controlling the percentage of time that said second valve means is open in accordance with the location of said value within the second range of values.

17. Apparatus as set forth in claim 15, wherein said sensed speed comparing means determines the difference between said sensed speed and said limit and adjusts said control signal in accordance with said difference.

18. Apparatus as set forth in claim 15 adapted for use in a system wherein engine speed is controlled by an operator controlled throttle valve also located between said fuel source and said fuel rail whereby said throttle valve is in series with both of said parallel first and second fluid flow paths, said apparatus further comprising an actuator coupled to said throttle valve, wherein said control means further comprises means for generating an actuator control signal when said apparatus is in an automatic speed maintaining mode, said actuator being responsive to said actuator control signal to fully open said throttle valve, whereby fuel flow is thereafter controlled by said first and second valve means alone.

19. Apparatus as set forth in claim 13, wherein said means for selecting comprises means for selecting said first valve means and closing said second valve means when low fuel flow rates are to be provided, and for selecting said second valve means when higher fuel flow rates are to be provided.

20. Apparatus for controlling fuel flow from a fuel source to the fuel rail of a fuel injected internal combustion engine comprising means defining first and second fuel flow paths adapted to be connected in parallel between said fuel source and said fuel rail, first and second means in said first and second fuel flow paths, respectively, for modulating fuel flow in the respective paths, said first means having a lower fuel flow capacity than said second means, and control means for providing low fuel flow rates by controlling said first means to vary fuel flow through said first path, and controlling said second means so that no fuel flow is provided through said second path at that time, and for providing higher flow rates by then controlling said second means to vary fuel flow through said second path.

21. Apparatus as set forth in claim 20, wherein internal combustion engine operates a driven part, and wherein said control means comprises means for controlling said first and second means so as to reduce fuel flow to said engine when the speed of said driven part exceeds a preset limit.

22. Apparatus for controlling fuel flow from a fuel source to the fuel rail of a fuel injected internal combustion engine which is drivingly coupled to a driven element, comprising first and second fuel flow paths adapted to be connected in parallel between said fuel source and said fuel rail, first and second on-off solenoid valves in said first and second fuel flow paths, respectively, said first on-off solenoid valve having a lower fuel flow capacity than said second on-off solenoid valve, means for sensing the speed of said engine driven element and for providing a speed signal indicative thereof, and control means responsive to said speed signal for providing a control signal and for controlling said first and second on-off solenoid valves in accordance therewith, said control means including means for generating a pulse width modulated signal and for applying said pulse width modulated signal to one of said on-off solenoid valves, where the duty cycle of said pulse width modulated signal and the one of said valves to which it is applied are determined in accordance with the value of said control signal.

23. Apparatus as set forth in claim 22 wherein said control means comprises means for adjusting the value of said control signal in accordance with the difference between the actual speed of said engine driven element and a preset limit, for selecting said first valve when the value of said control signal is within a first range and selecting said second valve when the value of said control signal is within a second range different than said first range, and for generating a pulse width modulated signal having a duty cycle in accordance with the difference between the value of the control signal and a limit of the range of values within which said control signal value falls.

24. Apparatus as set forth in claim 22, wherein said engine driven element is a part of the drive train of a vehicle with which said engine is associated whereby said speed signal indicates the speed of said vehicle, and wherein said apparatus further comprises means for providing a second speed signal indicative of engine speed, said control means comparing said vehicle speed signal and engine speed signal against associated limits and for adjusting said control signal so as to thereby control fuel flow to prevent either vehicle or engine speed from exceeding its associated limit.

25. Apparatus for controlling fuel flow from a fuel source to the fuel rail of a fuel injected internal combustion engine which is drivingly coupled to the drive train of a vehicle, comprising a valve assembly adapted to be connected between said fuel source and said fuel rail, said valve assembly including first and second fuel flow paths connected between a common fuel inlet and a common fuel outlet, said fuel inlet and outlet being adapted to be connected to said fuel source and fuel rail, respectively, and first and second on-off solenoid valves having dissimilar fuel flow capacities and connected in said first and second fuel flow paths respectively, vehicle speed sensor means for sensing the speed of said vehicle and providing a speed signal indicative thereof, and control circuitry means for applying a pulse width modulated signal to a selected one of said first and second valves, said control circuitry means selecting the duty cycle of said pulse width modulated signal and the valve to which said signal is to be applied in accordance with the value of a control signal, said control circuitry being responsive to said vehicle speed signal for adjusting the value of said control signal in accordance with the difference between said vehicle speed signal and a predetermined limit.

26. Apparatus for controlling fuel flow as set forth in claim 25, wherein said control circuitry means comprises a microcomputer programmed to adjust said control signal in accordance with the difference between said vehicle speed signal and a predetermined limit, compare the value of said control signal with a breakpoint value, apply said pulse width modulated signal to said first valve at a duty cycle corresponding to the value of said control signal if said control signal is below said breakpoint, and apply said pulse width modulated signal to said second valve at a duty cycle corresponding to the difference between said breakpoint and said control signal value if said control signal value is above said breakpoint.

* * * * *